Figure 1:
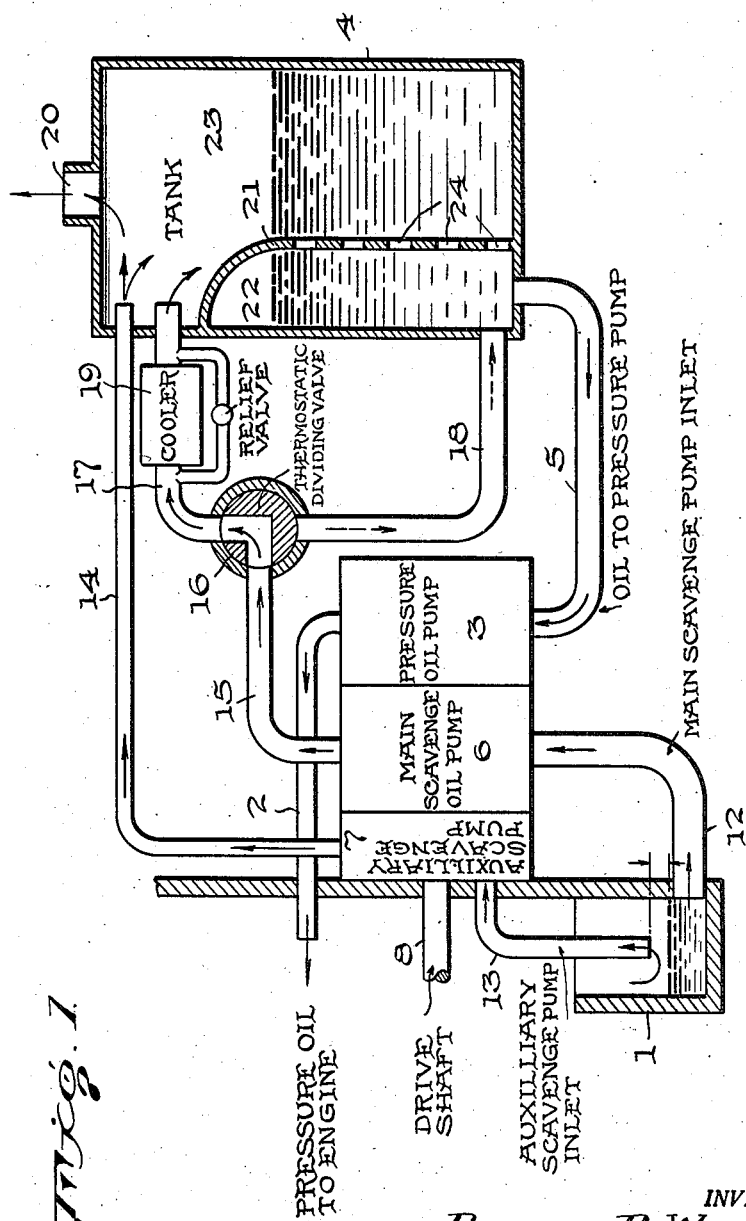

April 10, 1945.  B. R. WALSH  2,373,360
APPARATUS FOR DRY SUMP LUBRICATION OF ENGINES
Filed Oct. 29, 1943   2 Sheets-Sheet 2
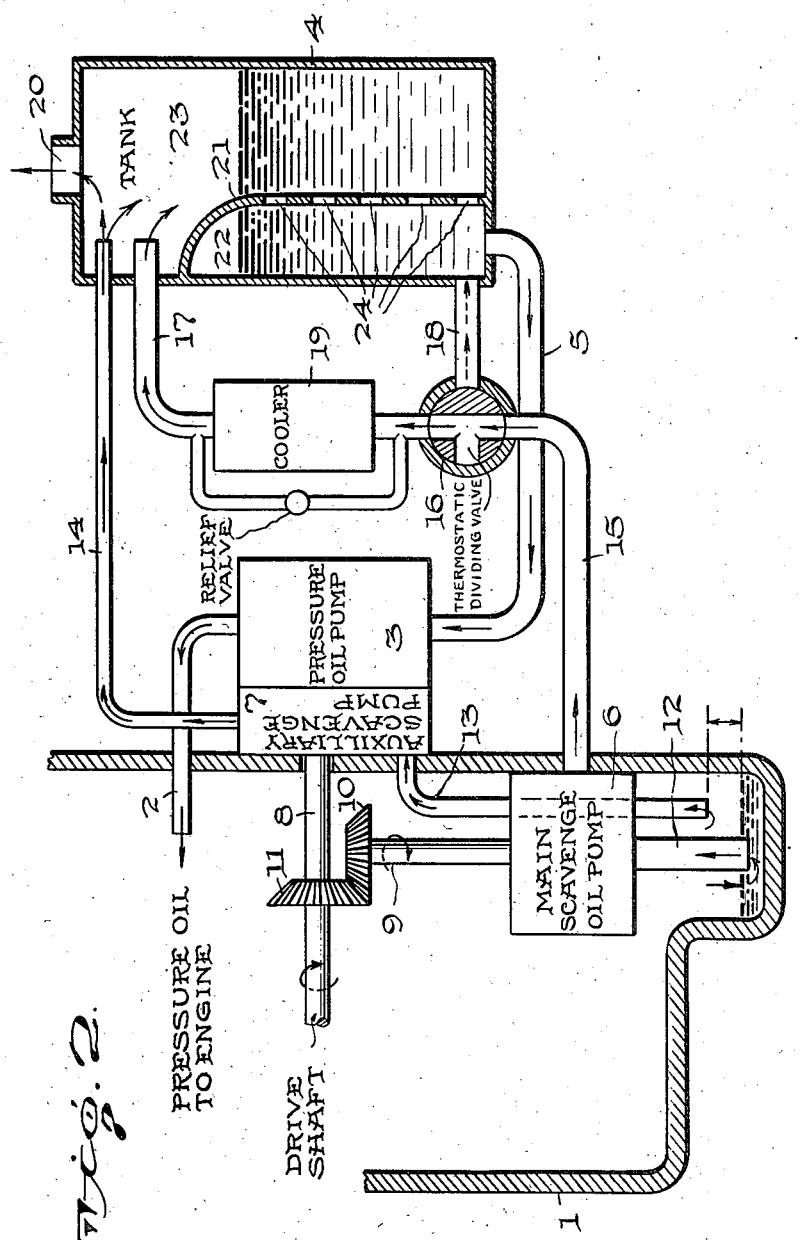

Patented Apr. 10, 1945

2,373,360

UNITED STATES PATENT OFFICE 2,373,360

APPARATUS FOR DRY SUMP LUBRICATION OF ENGINES

Bruce R. Walsh, Wilkinsburg, Pa., assignor to Gulf Research & Development Company, Pittsburgh, Pa., a corporation of Delaware Application October 29, 1943, Serial No. 508,173

7 Claims. (Cl. 184—6)

This invention relates to apparatus for dry sump lubrication of engines.

"Dry" sump lubricating systems for certain types of engines such as airplane engines are coming more into use because of the many advantages they present over and above systems in which a substantial supply of lubricating oil is maintained in the engine crank case. As contrasted with the latter or "wet" sump, the "dry" sump is simply a small capacity chamber designed as a sort of priming well for the scavenge pump. However, the sump must be large enough to accommodate sudden surges of oil draining from the crank case so that the crank case will be drained of oil. This is for the reason that the crank case in "dry" sump lubricated engines is not designed to contain any body or quantity of oil and should the sump overflow into the crank case as the result of its receiving oil from the crank case faster than it is removed by the scavenge pump, serious complications in the operation of the engine might result.

The advantages derived from the use of dry sump systems of lubrication are well known. In some relations, however, there is a definite disadvantage accompanying the use of such systems, namely, entrainment of air or gas in the lubricating oil. Entrainment of air in the oil may and in fact has been known to result in complete failure of lubrication. This is because the flow of oil to the engine is reduced to the danger point or below, due to the reduced delivery of oil by the oil pressure pump. Reduction in the quantity of lubricating oil because of entrained gas is particularly pronounced, for instance in an airplane engine, when the plane is rapidly elevated to an altitude of say 40,000 feet. Under these circumstances air or gas in the oil supply tanks will expand greatly by the time it reaches the pressure pump because of the high ratio of absolute pressure in the tanks to absolute pressure in the gear pump teeth.

Entrainment of air or gas seems mainly to occur in the scavenge pump which withdraws oil from the engine sump. In an endeavor to keep the sump free of oil the scavenge pump is designed and operated with a capacity of at least one and one-half times the capacity of the pressure lubricating pump. Thus, the scavenge pump is sucking air or gas along with oil during a considerable period of its operation and the gas becomes mechanically entrained in the oil due to the mixing it undergoes in the pump. In addition, the pressure pump capacity is usually considerably greater than the maximum flow demanded by the engine and the balance of the oil pumped is bypassed back to the inlet of the pressure pump through a pressure regulating valve. Under these conditions there results a ratio of scavenge pump capacity to pressure pump delivery (to the engine) which is in excess of one and one-half so that the scavenge pump sometimes handles as much or more than 63 per cent air.

In an endeavor to overcome this disadvantage, dry sump operated systems have been provided with de-aerating devices of various and complicated design. These, however, with their automatic valves, levers and pipe connections not only add to the intricacy of the power unit but are expensive and delivate in operation. Systems have also been devised for bypassing or recirculating oil between the scavenge pump and the sump to maintain a certain low level of oil in the sump above the scavenge pump inlet and thus prevent the sump sucking air but here again operation is dependent upon complex delicate, automatic and expensive apparatus, and air or gas already entrained in the oil in the sump is simply more thoroughly mixed during repeated passage through the pump and later separation rendered more difficult.

In the present invention the amount of air in the airplane tank is reduced at all altitudes in order that the pressure pump may continue to deliver the full engine oil demand.

Accordingly, it is an object of the present invention to provide a dry sump lubrication system in which little or no air is entrained in the oil during removal of the oil from the sump of the engine to a place of treatment or reservoir.

It is a further object of the invention to eliminate the use or need for separate de-aerating devices for removing entrained air from the lubricating oil.

A still further object of the invention is to obtain a substantial reduction in the quantity of air or gas entrained in the oil in removing the oil from the sump, without the use of automatic valves, floats, bypass arrangements and levers, etc.

These objects as well as further and additional objects, which will become apparent from the following disclosure, are attained by the method and apparatus of the present invention described below and illustrated in the accompanying drawings, wherein:

Figure 1 is a diagrammatic view partly in vertical section of a dry sump lubrication system showing one form of a specific embodiment of the present invention, while Figure 2 is a similar diagrammatic view showing a second form of such embodiment.

Referring to the drawings, the numeral 1 designates the usual lubricating oil sump of an internal combustion engine such, for example, as an airplane engine. As is well understood in the art, the oil sump is located at a low point relative to the internal, lubricated parts of the engine so that oil fed to these parts drains by gravity into the sump. In addition, since the flow to the sump is by gravity, there may be times, as during the flight of a plane when it is temporarily interrupted or irregular, due to the movement or position of the plane and the sump is flooded or substantially completely emptied. With some engine constructions lubricating oil is used to perform other functions than simply lubrication. It may be used as a medium through which force is applied to vary propeller pitch, as in an airplane, or to move other hydraulically operated controls and many times this oil also drains or is discharged into the engine sump. Thus, while the flow of oil to the sump is normally uniform and substantially equal to the flow of oil to the engine for lubricating the engine, it is at times aggravated or irregular.

Lubricating oil is delivered under pressure to the bearings and other working parts of the engine (not shown) through conduit 2 by means of pressure oil pump 3. Pressure pump 3 withdraws the oil from the tank 4 through conduit 5, preferably connected to or communicating with the bottom of the tank. To maintain the sump substantially dry without excessively entraining air in the oil, there is provided, according to the present invention, a main scavenge pump 6 and an auxiliary scavenge pump 7. The main scavenge pump has a capacity approximately equal to the capacity of the oil pressure pump, while the auxiliary scavenge pump has a capacity equal to the excess capacity of the scavenge pump system as required for the particular engine design and operation. All three pumps, that is, the main and auxiliary scavenge pumps and the oil pressure pump, may be arranged as a single unit for operation on the outside of the sump by a single drive shaft 8, as shown in Figure 1, or the main scavenge pump may be located in the sump and operated by a counter drive shaft 9 provided with a gear 10 meshing with the gear 11 on the drive shaft 8, as shown in Figure 2. In either event, the inlet to the main scavenge pump is through a pipe 12 arranged for delivering oil to the pump from a low point in the sump. With this arrangement, since the capacity of the main scavenge pump is substantially equal to the capacity of the pressure oil delivery pump, a level of oil once established in the sump tends to be maintained. However, with variable or sporadic drainage as previously described, the level of the oil may rise and overflow the sump. It is the function of the auxiliary pump in such an event to remove the excess oil in the sump above the normal operating level, as for example, the abnormal quantities which accumulate after maneuvers. For this purpose the auxiliary pump is provided with an inlet pipe 13 arranged to deliver oil from a point in the sump above the inlet to the main scavenge pump or substantially at normal operating level of oil in the sump. In normal operation the two scavenge pumps will maintain a level of oil in the sump, either at the inlet to the main scavenge pump, the inlet to the auxiliary scavenge pump, or somewhere within these limits, depending upon the operating efficiency of the main scavenge pump compared with that of the pressure pump and depending upon the amount of oil being bypassed in the pressure pump through the customary pressure regulating or relief valve.

While a capacity for the auxiliary scavenge pump approximately equal to half the capacity of the oil pressure pump is usually sufficient, a greater or smaller capacity may be used depending upon the conditions of operation.

The discharge from both main and auxiliary scavenge pumps is to supply tank or reservoir 4. As shown, the tank which is of conventional design is sufficiently large to provide an air space between the surface of the oil and the top of the tank. Auxiliary pump 7 delivers oil directly into the air space in the top of the tank by way of pipe 14, while the discharge from the main scavenge pump 6 is by way of pipe 15, thermostatic valve 16 and then by pipes 17 or 18 to the top or bottom, respectively, of the tank, depending upon the position of the valve. Pipe 17 communicates with a cooler 19 for cooling the oil before it enters the tank, while pipe 18 communicates directly with the bottom of the tank adjacent the inlet end of pipe 5. The thermostatic valve 16 directs the flow during the warm-up period to a point adjacent the inlet of the pipe leading to the engine lubricating pump. Thus, only a small portion of the supply in the tank is initially circulated, but as the oil becomes warm the valve 16 operates to close pipe 18 and open pipe 17 so that the oil then flows through the cooler in passage to the tank.

In high altitude operation where very low temperatures are encountered, it is possible for the cooler 19 to become frozen. In this event a pressure is imposed upon the discharge of the scavenge pump equal to the set pressure of a bypass valve around the cooler so that if a condition arises after maneuvering the airplane where the sump is momentarily emptied of oil, the scavenge pump is incapable of priming itself against the discharge pressure. Under such circumstances the auxiliary scavenge pump will pick up the oil and deliver it to the tank since its discharge pressure is very low.

Tank 4, as shown, is a relatively deep container provided with a suitable air vent 20 of conventional design in its top and an inner depending perforated baffle 21 extending inwardly and downwardly from the side wall adjacent the top to the bottom of the tank. The baffle divides the tank into two inter-communicating compartments, a small compartment 22 with which pipes 5 and 18 are in direct communication at the bottom, and a large compartment 23 into which oil from the cooler and pipe 14 discharges at the top. Inter-communication between the compartments is through perforations 24 in the baffle. To prevent splashing of the oil discharged into compartment 23, the top of baffle 21 immediately beneath pipes 14 and 17 curves gently inwardly and downwardly from the side of the tank, as shown, and receives and directs the flow of oil in a relatively thin smooth stream into the body of oil in the tank.

It is believed the operation of the apparatus will be clear from the foregoing description. Suffice it to point out that the auxiliary scavenge pump not only removes froth and excess oil from the engine sump, but it also forms a means of ventilating the crankcase of blow-by gases. These gases in a lubricating system become admixed with the lubricating oil by being taken in through the scavenge pump and result in the formation of lacquer deposits in the engine, which are avoided in the use of my invention.

With the capacities of the two scavenge pumps and the pressure pump properly proportioned, and with the scavenge pump inlets arranged as described, the main scavenge pump will normally deliver oil only and will not suck air or blow-by gases, while the auxiliary scavenge pump will normally pump air or oil only, and will suck or pump air and oil simultaneously for only brief periods of its operation. The capacity of the main scavenge pump compared with the capacity of the pressure pump may, of course, be selected to suit various operating conditions which may be desired and to suit the altitude at which the pressure regulating valve on the pressure pump may be closed. Also, the auxiliary scavenge pump may be as large as the designer desires for any particular application.

From the foregoing it will be apparent that this construction results in a very considerable reduction in the quantity of air entrained in the lubricating oil delivered by the pressure pump to the engine with the result that the pressure pump is able to maintain full flow to the engine at a high altitude or at a lower value of absolute pressure at the pressure pump inlet.

What I claim is:

1. Apparatus for dry sump lubrication of engines comprising an engine sump, a tank containing oil, an air vent in the top of the tank, means for withdrawing oil from the tank and delivering it to the engine for lubricating the same, means of substantially equal capacity with said first named means for withdrawing oil from a low point in the sump and delivering it to the tank, and separate means for withdrawing oil from a high point in the sump and discharging it separately into the tank above the surface of the oil therein.

2. The subject matter of claim 1 wherein the means of substantially equal capacity with the first named means is positioned in the engine sump.

3. Apparatus for lubricating a dry sump lubricated engine comprising a tank adapted to contain oil, an air vent in the tank, a conduit connecting the engine sump and tank for delivering oil from a low point in the sump to the tank, a second conduit for separately delivering oil from a high point in the sump to the tank, said second conduit being arranged to discharge oil into the top of the tank above the level of the oil in the tank, means for delivering oil under pressure to the engine for lubricating the same, means of substantially equal capacity with said first named means for delivering oil from the sump through the first named conduit to the tank, and means for delivering oil from the sump through said second named conduit for separate discharge into the top portion of the tank.

4. The subject matter of claim 3 wherein said means are pumps driven by the engine in continuous operation therewith.

5. In an engine lubricating system including an oil pressure pump fed from a storage tank, a main scavenge pump of capacity approximately the same as the said pressure pump, said main scavenge pump drawing oil from the engine sump at a low level and delivering it to the storage tank, an auxiliary scavenge pump the capacity of which added to that of said main scavenge pump substantially exceeds the capacity of said pressure pump, said auxiliary scavenge pump drawing oil from the sump at a higher level than said main scavenge pump and separately delivering the same to said storage tank at a point which permits air entrained therein to be separated and vented.

6. Apparatus for dry sump lubrication comprising a circulatory system for the oil, such system including a tank with a capacity slightly greater than the quantity of oil in circulation whereby an air space for the tank is established in the top of the tank, means for circulating the oil from a point below its level in said tank to points of lubrication, a sump for reception of the oil from the points of lubrication, means for delivering the oil from a low point in said sump and below the oil level to said tank to assist in maintaining a normal level of the oil in said sump, and auxiliary means for separately delivering oil from a higher point in said sump to the air space in said tank to assist in maintaining the sump substantially free of oil above said normal level and to separately deliver any foam or air from said sump to a point above the body of the oil in said tank.

7. The subject matter of claim 6 wherein said auxiliary means delivers oil from a point in said sump substantially at but not below the normal level of oil in the sump.

BRUCE R. WALSH.